June 9, 1959           W. STELZER           2,890,036
LETTER WEIGHING SCALES
Filed March 17, 1954
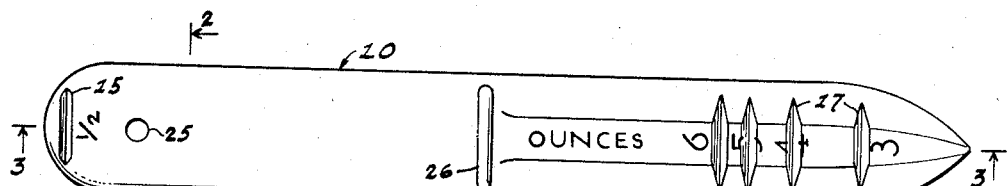
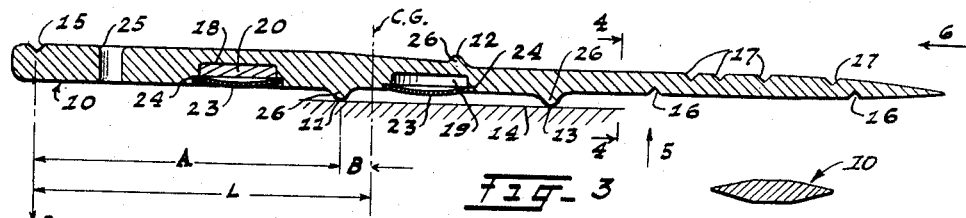
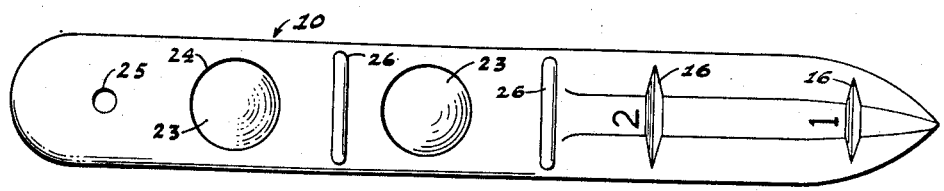
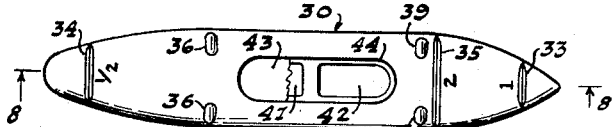
INVENTOR.
William Stelzer

United States Patent Office 2,890,036
Patented June 9, 1959

2,890,036
LETTER WEIGHING SCALES
William Stelzer, Summit, N.J.

Application March 17, 1954, Serial No. 416,848

2 Claims. (Cl. 265—53)

The invention relates to a letter weighing scale comprising a beam fulcrumed on a flat and level surface of a piece of furniture or other object that is not a part of the weighing scale. The novel weighing scale is related to the construction shown in my copending application Serial No. 398,955, filed December 18, 1953, now Patent No. 2,764,401.

The object of the invention is to produce a simple and accurate letter weigher comprising a plurality of fulcra on which the beam may pivot and a plurality of notches into which a letter or envelope may be placed edgewise, whereby the user balances the upper part of the letter by holding it loosely between the fingers.

Another object is to place the fulcra on both top and bottom sides of the beam at different locations relative to the center of gravity of the beam, where each side may have a fulcrum between the center of gravity and each end of the beam so that several different weighing ranges and consequently greater accuracy and sensitivity are obtained.

A further object is to bring the various weighing ranges into relation with each other through the predetermined weight of the scale where the location of the center of gravity is in definite relation to the fulcrum of each range or lever system. While in weighers of this type with a single range the location of the center of gravity and the weight of the beam or resistant is not critical, as the moment can be adjusted by changing either the center of gravity of the weight of the beam, in the new system where there are more than two weighing ranges, the weight and the location of the center of gravity cannot vary.

Another object is to provide means to adjust the weight of the beam and location of the center of gravity to be in proper relation to all the different weighing ranges.

Other objects and advantages of this invention will be apparent from the following detailed description considered in connection with the accompanying drawing submitted for the purpose of illustration and not to define the scope of the invention, reference being had for that purpose to the subjoined claims. In the drawing, wherein similar reference characters refer to similar parts throughout the several views:

Fig. 1 is a plan view of the improved scale;
Fig. 2, a section taken on lines 2—2 of Fig. 1;
Fig. 3, a section taken on lines 3—3 of Fig. 1;
Fig. 4, a section taken on lines 4—4 of Fig. 3;
Fig. 5, a plan view of the scale shown in an inverted position, as seen in the direction of arrow 5 in Fig. 3;
Fig. 6, an end view of the scale as seen in the direction of arrow 6 of Fig. 3;
Fig. 7, a plan view showing a modified form of the invention, drawn to a reduced scale; and
Fig. 8, a section taken on lines 8—8 of Fig. 7.

Before explaining the present invention in detail, it is to be understood that the invention is not limited in its application to the details of construction and arrangement of parts illustrated in the accompanying drawing, since the invention is capable of other embodiments and of being practised or carried out in various ways. Also it is to be understood that the phraseology or terminology employed herein is for the purpose of description and not limitation.

Referring now to Figs. 1 to 6, the scale consists of a relatively wide beam 10 of minimum height having a plurality of fulcra 11, 12 and 13 to pivot on a flat bearing surface 14 which may be the top of a piece of furniture or other object not a part of the scale. The outer ends of the beam have locating marks in the form of V-shaped transverse notches 15, 16 and 17 marked with numerals designating the weight in ounces producing equilibrium when such weight is placed in the notch. In the embodiment shown there are three different systems or ranges of which each has its own fulcrum. Thus fulcrum 11 and notch 15 constitute a system for loads up to ½ oz.; fulcrum 12 and notches 16 a system for loads of one and two ounces; and fulcrum 13 and notches 17 a system for loads of 3, 4, 5, and 6 oz. The criterion adopted in accordance with the invention is that the location of the center of gravity of the scale is in fixed relation to all the fulcra and load carrying notches and that the scale is of a fixed and predetermined weight. If A is the distance between the fulcrum and a load carrying notch of one system, L the distance between said notch and the center of gravity C.G. of the beam where the weight W of the beam may be considered concentrated, and P the designated load acting at the notch, then $$B = \frac{PL}{(P+W)}$$

wherein B is the distance between the fulcrum and the center of gravity of the beam. The value $$\frac{PA}{B}$$

must be the same for all three lever systems and equals the weight W. Since in mass production it is comparatively easy to hold the distances between fulcra and notches with sufficient accuracy, but difficult to produce a beam of the exact weight with its center of gravity at a definite point, I introduce means for adjusting the weight and location of the center of gravity of the beam in the form of a pair of pockets or loculi 18 and 19 adapted to carry ballast, a ballast weight 20 being shown in pocket 18 of Fig. 3. The pockets are located on opposite sides of the center of gravity, i.e., one pocket is located between the center of gravity and one end of the beam, and the other pocket is located between the center of gravity and the other end of the beam. Thus by adding ballast to one pocket or the other, the center of gravity may be shifted until the correct location is obtained. The beam is manufactured slightly underweight, so that always some ballast has to be added. The ballast is retained by caps or plugs 23 pressed into recesses 24. These plugs are suited to carry indicia for advertising or to give certain information or instruction in connection with the use of the scale. A hole 25 is provided so that the scale may be hung on a nail when not in use. In order to increase the utility of the scale, one end of the beam is knife-shaped so that it can also serve as a letter opener; this additional feature being obtained without increasing the cost of the scale.

The fulcra 11, 12 and 13 are obtained by cylindrically rounded projections 26 extending below the body of the beam to rock or roll on surface 14. The point from which the radius of the rounded projection 26 is struck is the pivot point about which the beam rocks. The radius can be chosen to be of increased length so that the pivot point is nearer to the elevation of the load carrying notch. While this feature would be desirable where surface 14 is perfect, certain inaccurate weighing would result if surface 14 is uneven. Therefore, it is preferable to make the radius of projection 26 fairly small, as shown in Fig. 3, or to use a knife edge.

In the modified construction shown in Figs. 7 and 8, a beam 30 is designed to serve four separate weighing systems of which each has its own fulcrum and notches. Instead of concentrating the weight of the beam near one end, the center of gravity "C.G." is located near the center of the beam as both ends are adapted to receive a load to be weighed. Thus projections or fulcrum legs 31 serve the ½ oz. notch 34, legs 32 the 1 and 2 oz. notches 33, 35, legs 36 the 3 and 4 oz. notches 37, 38, and legs 39 the 5 oz. notch 40. Pockets 41 and 42 are disposed towards opposite sides of the center of gravity of the beam so that addition of ballast to one or the other pocket adjusts the location of the center of gravity and weight of the beam. A common cover 43 pressed into a recess 44 closes off pockets 41 and 42 after adjustment has been made.

Having thus described my invention, I claim:

1. A letter weighing scale of a predetermined weight and consisting of a relatively wide beam of minimum height, a transversely disposed projection extending downwardly from said beam and located intermediate the center of gravity of said scale and one end of said beam so that said beam may fulcrum on any flat level surface by means of said projection, at least one locating notch suitable to support a letter or similar article on top of and near said one end of said beam, a second transversely disposed projection extending downwardly from said beam and located intermediate the center of gravity of said scale and the other end of said beam so that said beam may fulcrum of said flat level surface by means of said second projection, and at least one locating notch on top of and near said other end of said beam, said first mentioned projection and said first mentioned locating notch belonging to one weighing system and said second projection and corresponding second locating notch belonging to a second weighing system, both of said weighing systems having a different range of weights, the distance between a projection of one system and the center of gravity of said scale being equal to the designated weight at the corresponding notch times the distance between said corresponding notch and the center of gravity of said scale divided by the sum of the designated weight at said corresponding notch and the weight of said scale.

2. The construction as claimed in claim 1, and a pocket extending a distance between the center of gravity and both ends of said beam adapted to receive ballast for adjusting the weight and location of the center of gravity of said beam, whereby after adjustment said beam has a fixed and predetermined weight and the location of said center of gravity is in a fixed and predetermined relation to said projections, and cover means to permanently close said pocket after adjustment has been made.

References Cited in the file of this patent

UNITED STATES PATENTS

| 1,622,924 | Richie | Mar. 29, 1927 |
| 1,732,300 | Buck | Oct. 22, 1929 |
| 2,764,401 | Stelzer | Sept. 25, 1956 |

FOREIGN PATENTS

| 22,337 | Germany | May 21, 1883 |
| 1,131 | Great Britain | Jan. 18, 1900 |